(12) United States Patent
Tindell

(10) Patent No.: US 10,946,541 B2
(45) Date of Patent: Mar. 16, 2021

(54) ROOT CUTTING TOOL

(71) Applicant: James Tindell, Lake Worth, FL (US)

(72) Inventor: James Tindell, Lake Worth, FL (US)

(*) Notice: Subject to any disclaimer, the term of this patent is extended or adjusted under 35 U.S.C. 154(b) by 0 days.

(21) Appl. No.: 16/125,150

(22) Filed: Sep. 7, 2018

(65) Prior Publication Data

US 2020/0078970 A1    Mar. 12, 2020

(51) Int. Cl.
*A01B 1/02* (2006.01)
*B26B 23/00* (2006.01)

(52) U.S. Cl.
CPC ............ *B26B 23/00* (2013.01); *A01B 1/02* (2013.01)

(58) Field of Classification Search
CPC ............ A01B 1/02; B25F 1/02; B26B 23/00
USPC ............................. 7/166, 169; 30/335; 172/13
See application file for complete search history.

(56) References Cited

U.S. PATENT DOCUMENTS

| | | | | |
|---|---|---|---|---|
| 385,324 | A * | 6/1888 | Seller | A01C 5/02 111/99 |
| 5,529,130 | A | 6/1996 | Suk | |
| 5,848,653 | A | 12/1998 | Warter | |
| 8,291,995 | B1 | 10/2012 | Stoklasa | |
| 2003/0056961 | A1 * | 3/2003 | Jones | A01B 1/16 172/371 |
| 2011/0162491 | A1 * | 7/2011 | Belsey | B25D 1/00 81/463 |
| 2011/0258862 | A1 | 10/2011 | Oberg et al. | |
| 2014/0076595 | A1 | 3/2014 | Belsey et al. | |

FOREIGN PATENT DOCUMENTS

DE    202018000864 U1 *  6/2018  ............... A01B 1/16

OTHER PUBLICATIONS

Council Tool, model TB6 (Year: 2016).*
Council Tool, model TB4 (Year: 2016).*
Ludell 500 (Year: 2016).*
Bully Tools 92539 (Year: 2015).*
Powerpak (Year: 2018).*
The Council Tool, Model TB6, Published 2017 (Year: 2017).*
The Council Tool, information (Year: 2016).*
Crowbar CBO-250, unknown published date (Year: 2020).*
Crowbar, unknown published date (Year: 2020).*

* cited by examiner

*Primary Examiner* — Kenneth E Peterson
*Assistant Examiner* — Nhat Chieu Q Do
(74) *Attorney, Agent, or Firm* — Malloy & Malloy, P.L.; Robert M. Downey

(57) ABSTRACT

A tool for cutting through roots in the soil includes an elongate bar formed of solid steel with an enlarged knob on a top end and a weighted cutting head on a bottom end. The cutting head is formed of solid tempered steel and is in the configuration of an axe head with a sharpened arcuate cutting edge on the lowermost distal end. A longitudinal axis of the bar extends through a center of the cutting edge. In a preferred embodiment, the entire tool is made as one piece forged steel.

4 Claims, 3 Drawing Sheets

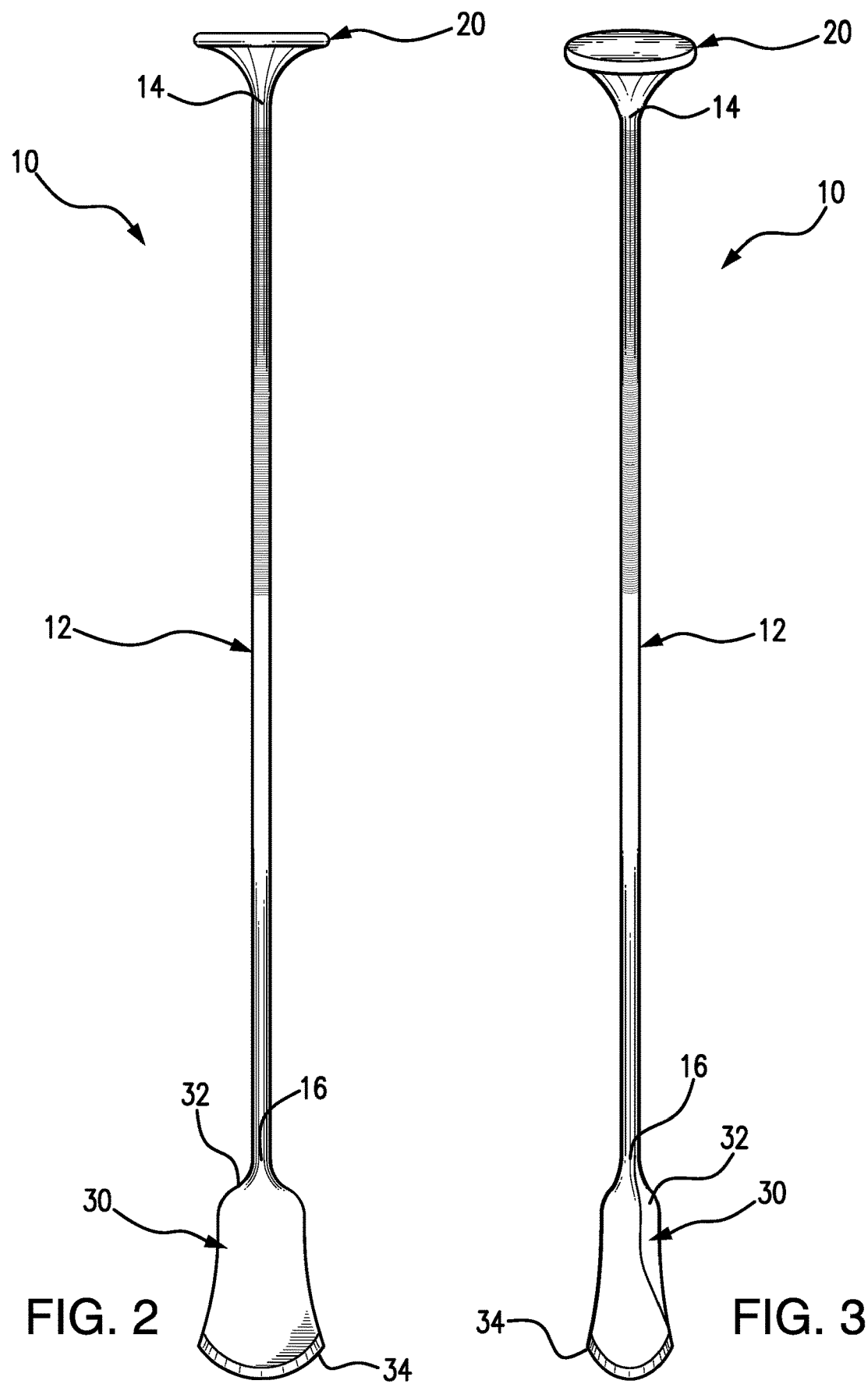

ROOT CUTTING TOOL

BACKGROUND OF THE INVENTION

Field of the Invention

The present invention relates to a tool for cutting roots, and more particularly to a root cutting tool including a solid steel elongate bar and a weighted cutting head at the bottom end of the bar; the cutting head including a sharpened cutting edge at a lowermost distal end.

Discussion of the Related Art

There are many tasks that require digging one or more holes in the ground using manually operated tools. For example, installation of fencing typically requires digging holes for placement of fence posts at spaced intervals. In many instances, this is done using a manually operated post hole digger. Other tasks, such as planting trees or shrubs, or installing underground piping, require digging into the earth with a shovel. The manual labor involved in these digging tasks can be exhausting, especially if the person digging the hole(s) encounters roots, rocks and/or limestone that obstruct the use of the post hole digger or shovel. When this occurs, it is necessary to cut through and/or remove the obstruction. Currently, the most common manually operated tool used to break through roots and remove rocks is known as a rock bar (also known as a digging bar). A rock bar consists of a steel bar with a generally narrow head on the bottom end of the bar. The narrow head has a blunt bottom edge. To break through roots, the rock bar is forced downwardly in a stabbing action, relying primarily on the strength of the user. Alternatively, the head of the rock bar can be forced under the roots, whereupon the user pulls downwardly or leans on the bar to create a prying action. In either case, the use of the rock bar can place a significant strain on the user's back, shoulders and arms, especially when digging numerous holes, such as post holes for fence installation.

Accordingly, there remains a definite need for a manually operated tool that easily cuts through roots and other obstructions in the ground when digging holes, without placing a strain on the user.

OBJECTS AND ADVANTAGES OF THE INVENTION

Considering the forgoing, it is a primary object of the present invention to provide a root cutting tool that easily cuts through roots and other obstructions in the ground without placing a strain on the user.

It is a further object of the present invention to provide a root cutting tool that easily cuts through roots and other obstructions in the ground, and wherein the tool relies primarily on the weight of the tool and gravity, thereby minimizing strain on the user's back, shoulders and arms.

It is still a further object of the present invention to provide a root cutting tool that is formed as one piece forged steel.

It is still a further object of the present invention to provide a root cutting tool that includes a solid steel elongate bar and a weighted cutting head generally in the shape of an axe head, and wherein the cutting head includes a lowermost sharpened cutting edge that easily cuts through roots and other obstructions in the ground with minimal effort by the user.

It is still a further object of the present invention to provide a root cutting tool including a solid steel bar and a tempered steel cutting head that is in the form of an axe head having a lowermost arcuate cutting edge that easily cuts through roots and other obstructions in the ground, relying primarily on the weight of the tool, including the stolid steel bar and tempered steel cutting head.

It is still a further object of the present invention to provide a manually operated root cutting tool that relies primarily on the weight of the tool and gravity for cutting through roots and other obstructions in the ground, and wherein the user can easily operate the tool while standing straight up, without bending or placing a strain on the user's back.

These and other objects and advantages of the present invention are more readily apparent with reference to the following detailed description taken in conjunction with the accompanying drawings.

SUMMARY OF THE INVENTION

The present invention is directed to a tool for cutting through roots in the soil, particularly when digging holes in the soil for installation of fencing, planting of trees and shrubs, installation of underground plumbing/irrigation, and other tasks that require digging one or more holes in the ground. The root cutting tool includes an elongate solid steel bar with a knob on the top end of the bar. The tool further includes a cutting head formed of solid tempered steel at the bottom end of the steel bar. The cutting head is preferably in the configuration of an axe head and includes a sharpened arcuate cutting edge on the lowermost distal end. The longitudinal axis of the steel bar extends through a center of the cutting edge so that the cutting head is perfectly in line with the longitudinal axis of the elongate steel bar. In a preferred embodiment, the entire tool, including the bar, the knob and the cutting head, is formed as one piece forged steel. The weight of the cutting head ranges between 4.0 pounds to 8.0 pounds, the weight of the bar ranges between 13.0 pounds to 15.0 pounds, while the total weight of the tool ranges between 18.0 pounds to 23.0 pounds.

In use, the tool is held perfectly vertical, with the cutting head at the bottom and approximately 6 to 18 inches above the root(s) or other obstruction that is encountered when digging a hole in the soil. The user of the tool stands straight up, with the back straight and knees slightly bent, at all times. When held above the root(s) to be cut, the user simply loosens the grip on the steel bar, allowing the tool to fall straight down, as the bar slides through the user's hands until the cutting edge of the cutting head hits the root(s) to be cut. The cutting action of the tool relies totally on the weight of the tool, including the solid steel bar and the solid tempered steel cutting head, with virtually no effort from the user except the effort to pull the tool back up to the raised position for a subsequent drop and strike of the cutting edge against the root(s) being cut.

BRIEF DESCRIPTION OF THE DRAWINGS

For a fuller understanding of the nature of the present invention, reference should be made to the following detailed description taken in conjunction with the accompanying drawings in which:

FIG. 2 is a front elevational view of the root cutting tool of the present invention;

FIG. 3 is a front, side perspective view of the root cutting tool of the present invention.

Like reference numerals refer to like parts throughout the several views of the drawings.

DETAILED DESCRIPTION OF THE PREFERRED EMBODIMENT

Figure 1A:
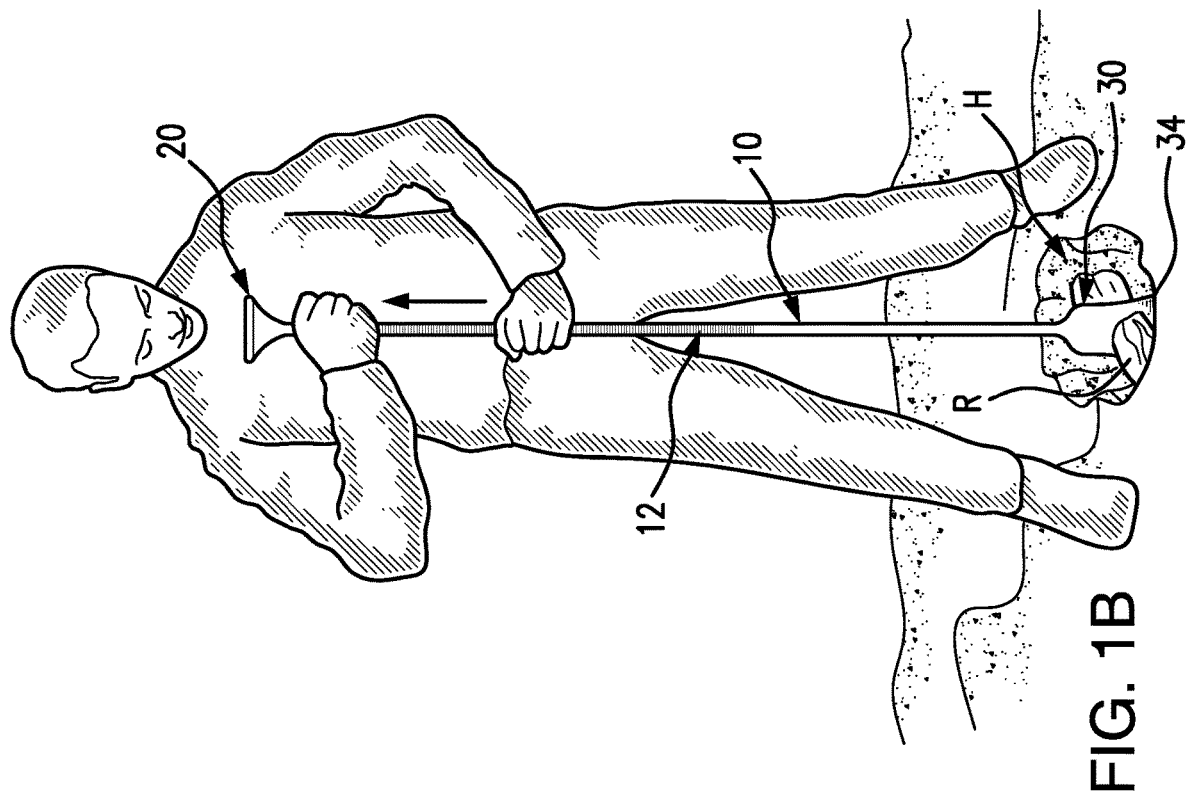
FIG. 1A is a front perspective view showing a user of the tool holding the tool of the present invention above a hole in the ground, with a lowermost cutting edge of the tool positioned approximately 6 to 18 inches above the root to be cut in the hole.

The root cutting tool of the present invention is shown throughout the several views of the drawings and is generally indicated as 10. Referring initially to FIGS. 2 and 3, the root cutting tool 10 includes an elongate solid steel bar 12 having a top end 14 and a lower end 16. An enlarged knob 20 is formed on the top end 14 of the solid steel bar 12. In a preferred embodiment, the knob 20 is integrally formed with the bar 12 and is also solid steel. A cutting head 30 is fixed to the lower end 16 of the solid steel bar 12 and is generally in the shape of an axe head. The cutting head includes a top end 32 and a sharpened cutting edge 34 along a lowermost distal end. The top end 32 has rounded corners to discourage snags with roots when using the tool. In a preferred embodiment, the sharpened edge 34 is an arcuate blade edge that is periodically sharpened in the same manner as an axe head. The weight of the cutting head ranges between 4.0 pounds to 8.0 pounds, the weight of the bar ranges between 13.0 pounds to 15.0 pounds, while the total weight of the tool ranges between 18.0 pounds to 23.0 pounds. In one preferred embodiment, the cutting head weighs 6.0 pounds, the bar weighs 14.0 pounds and the total weight of the tool is 20.0 pounds.

Figure 1B:
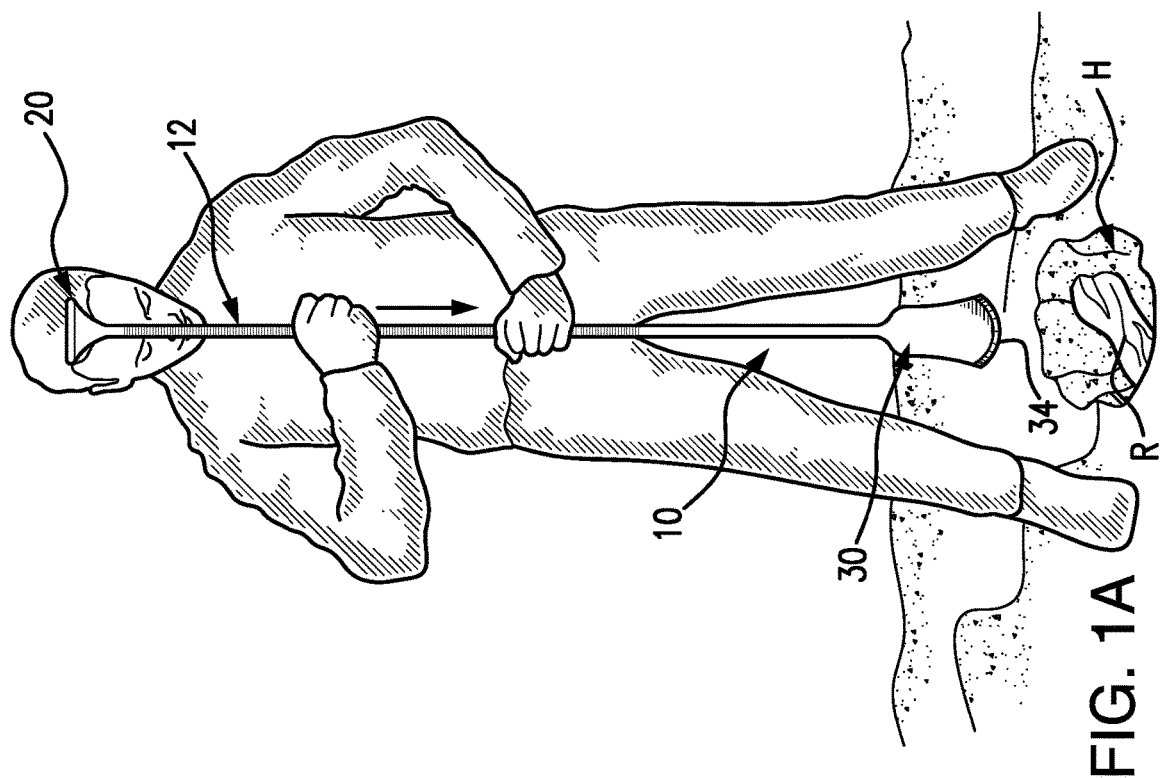
FIG. 1B is a front perspective view showing the tool of the present invention dropped and cutting through the root in the hole in the ground, whereupon the user then lifts the tool back up to the position shown in FIG. 1A for a subsequent drop and cutting strike against the root(s) in the ground.
Figure 4:
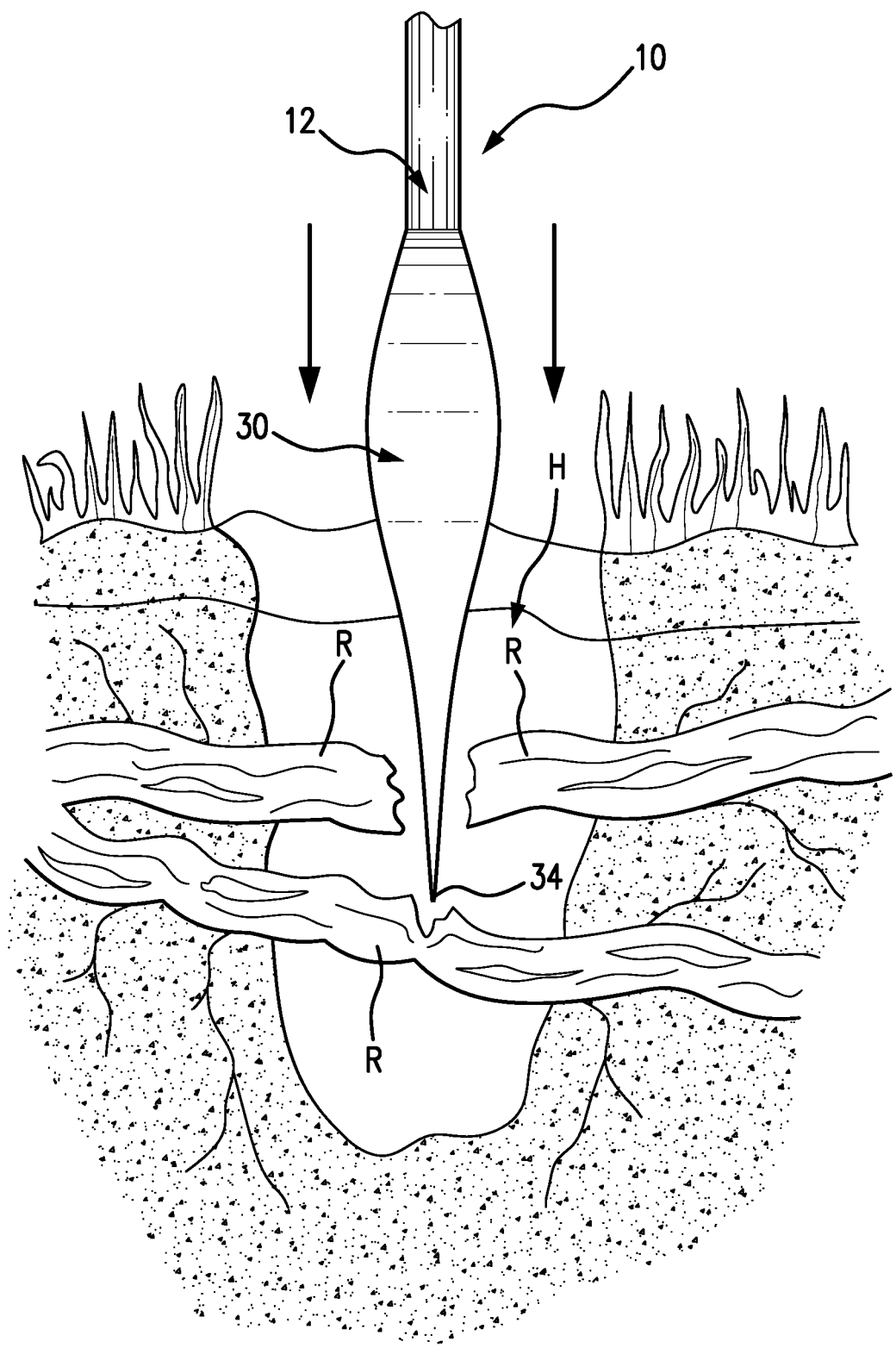
FIG. 4 is an isolated view, shown in partial cross section, showing the cutting head of the tool of the present invention dropping and cutting through roots within a hole that has been previously dug in the soil.

FIGS. 1A and 1B demonstrate the manner of use of the root cutting tool 10 for cutting one or more roots R in the soil, such as in a hole H that has been dug in the soil. In order to continue digging the hole deeper, it is necessary to remove the one or more root R obstructions, as well as any other obstructions such as rocks or limestone. The tool of the present invention is particularly useful for cutting through roots, with minimal effort by the user, so that the hole can be properly formed for receiving a fence post, tree or shrub, for example. In use, the user stands above the hole H that has the root R obstruction within the hole H, and holds the tool perfectly vertical, while the user stands up straight with the knees slightly bent. The cutting head 30 is held above the hole, with the lowermost cutting edge 34 positioned approximately 6 to 18 inches above the root or other obstruction that is encountered when digging the hole. When properly held in the position, as shown in FIG. 1A, the user then simply relaxes the grip on the bar 12, allowing the bar to slide through the hands of the user, as indicated by the directional arrow. The cutting head 30 then drops into the hole, with the sharpened cutting edge 34 striking the root, as seen in FIG. 1B and FIG. 4. The user then lifts the tool back up to the position shown in FIG. 1A for a subsequent dropping and cutting action. While lifting the tool upwardly, as indicated by the directional arrow in FIG. 1B, the user may use the knob 20 to assist in lifting the tool while preventing the hands from slipping off of the top end of the bar 12. Additionally, the upper portion of the bar 12 is provided with a texture that is stamped into the steel to provide a better grip of the user's hands on the bar when using the tool. The textured grip may be in the form of annular rings, as seen in FIGS. 1A-3. Alternatively, the textured grip may be a knurled surface. The cutting action of the tool relies totally on the weight of the tool and gravity. Ideally, the user maintains an upright posture throughout the entire process while using the tool, to prevent strain on the back, shoulders and arms.

While the present invention has been shown in accordance with a preferred and practical embodiment, it is recognized that departures from the instant disclosure are fully contemplated within the spirit and scope of the present invention which is not to be limited except as defined in the following claims.

What is claimed is:

1. A root cutting tool comprising:
   an elongate solid steel bar having a first end and a second end, and a longitudinal axis extending from the first end to the second end, and a diameter defining a transverse dimension of the bar:
   a knob on the first end of the bar and the knob having a transverse dimension that is greater than the transverse dimension of the bar;
   a cutting head formed of solid tempered steel at the second end of the bar, and the cutting head including a continuous arcuate cutting edge at a lowermost distal end of the tool, and a center of the continuous arcuate cutting edge positioned in axial alignment with the longitudinal axis of the bar, and the continuous arcuate cutting edge extending beyond the transverse dimension of the bar;
   the cutting head further including opposite lower side faces adjacent to the continuous arcuate cutting edge, that is convex and the opposite lower side faces being angled relative to one another at an acute angle;
   the cutting head further including opposite upper side faces extending from the opposite lower side faces to a top end of the cutting head, and the cutting head having a maximum transverse width measured between the opposite upper side faces that is greater than the transverse dimension of the bar; and
   the cutting head further including rounded outboard corners at the top end, wherein the weight of the cutting head ranges between 4-8 pounds.

2. The root cutting tool as recited in claim 1 wherein the weight of the solid steel bar ranges between 13.0 pounds and 15.0 pounds.

3. The root cutting tool as recited in claim 2 wherein the total weight of the tool ranges between 18.0 pounds and 23.0 pounds.

4. The root cutting tool as recited in claim 1 wherein the weight of the solid steel bar and the knob is 14.0 pounds and the weight of the cutting head is 6.0 pounds.

* * * * *